United States Patent
Hamamoto

(10) Patent No.: US 11,768,640 B2
(45) Date of Patent: Sep. 26, 2023

(54) INFORMATION PROCESSING DEVICE, INFORMATION PROCESSING SYSTEM, AND INFORMATION PROCESSING METHOD

(71) Applicant: SHARP KABUSHIKI KAISHA, Sakai (JP)

(72) Inventor: Masanori Hamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/826,640

(22) Filed: May 27, 2022

(65) Prior Publication Data
US 2022/0391154 A1  Dec. 8, 2022

(30) Foreign Application Priority Data
Jun. 2, 2021  (JP) .................................. 2021-093115

(51) Int. Cl.
*G06F 3/12*  (2006.01)

(52) U.S. Cl.
CPC ............ *G06F 3/1231* (2013.01); *G06F 3/121* (2013.01); *G06F 3/1273* (2013.01)

(58) Field of Classification Search
CPC ....... G06F 3/1231; G06F 3/121; G06F 3/1273
See application file for complete search history.

(56) References Cited

U.S. PATENT DOCUMENTS

| 2006/0034318 | A1* | 2/2006 | Fernandes | H04L 12/2854 370/463 |
| 2008/0137580 | A1* | 6/2008 | Axelsson | H04L 61/00 370/315 |
| 2009/0080447 | A1* | 3/2009 | Sawada | H04L 61/103 370/392 |
| 2015/0372971 | A1* | 12/2015 | Hashimoto | H04L 61/5007 709/245 |
| 2017/0286134 | A1* | 10/2017 | Sumiuchi | H04N 1/32797 |
| 2019/0058731 | A1* | 2/2019 | Garg | H04L 63/1466 |
| 2019/0068553 | A1* | 2/2019 | Hiramoto | H04L 61/103 |
| 2021/0006677 | A1* | 1/2021 | Ushinohama | H04N 1/00474 |

FOREIGN PATENT DOCUMENTS

JP  2008-171150 A  7/2008

* cited by examiner

*Primary Examiner* — John R Wallace
(74) *Attorney, Agent, or Firm* — ScienBiziP, P.C.

(57) ABSTRACT

An information processing device includes a storage and a controller. The storage stores identification information and registration information of an image forming device in association with each other. The controller connects to the image forming device, based on the identification information, to acquire device information of the image forming device. If the acquired device information does not match the registration information, the connected image forming device announces that the connected image forming device is different from the image forming device identified by the registration information.

7 Claims, 16 Drawing Sheets

FIG. 3

| AGGREGATION TARGET | IP ADDRESS | MODEL NAME | SERIAL NUMBER | JOB LOG ACQUISITION TIME | FINAL JOB ID | ADMINISTRATOR LOGIN NAME | PASSWORD | REMARKS |
|---|---|---|---|---|---|---|---|---|
| TRUE | 192.168.0.1 | MX-6170FV | 000001 | JANUARY 23, 2020 17:30 | 5003 | loginname | test | DEPARTMENT 2 |
| TRUE | 192.168.0.2 | MX-3631 | 000002 | JANUARY 23, 2020 17:30 | 143 | loginname | test | DEPARTMENT 1 |
| TRUE | 192.168.0.3 | MX-4071 | 000003 | JANUARY 23, 2020 17:30 | 31244 | loginname | test | DEPARTMENT 3 |
| ... | ... | ... | ... | ... | ... | ... | ... | ... |
| TRUE | 192.168.0.100 | MX-4071 | 000100 | JANUARY 23, 2020 17:30 | 321 | loginname | test | DEPARTMENT 1 |

FIG. 7

| | MODEL NAME | SERIAL NUMBER | IP ADDRESS | ADMINISTRATOR LOGIN NAME | ADMINISTRATOR PASSWORD | JOB LOG ACQUISITION TIME | REMARKS |
|---|---|---|---|---|---|---|---|
| ☐ ◯ | MX-6170 | 000001 | 192.168.0.1 | loginname | ************ | JANUARY 23, 2020 17:30 | FIRST FACTORY |
| ☐ ◯ | MX-3631 | 000002 | 192.168.0.2 | loginname | ************ | JANUARY 23, 2020 17:30 | HEAD OFFICE |
| ☐ ◯ | MX-4071 | 000003 | 192.168.0.3 | loginname | ************ | JANUARY 23, 2020 17:30 | DEPARTMENT 1 |
| ☐ ✕ | MX-3631 | 000004 | 192.168.0.4 | loginname | ************ | JANUARY 23, 2020 17:30 | DEPARTMENT 1 |
| ☐ ✕ | MX-6170FV | 000005 | 192.168.0.5 | loginname | ************ | JANUARY 23, 2020 17:30 | DEPARTMENT 2 |
| ☐ ◯ | MX-3631 | 000006 | 192.168.0.6 | loginname | ************ | JANUARY 23, 2020 17:30 | DEPARTMENT 2 |
| ☐ ◯ | MX-4071 | 000007 | 192.168.0.7 | loginname | ************ | JANUARY 23, 2020 17:30 | DEPARTMENT 3 |
| ☐ ◯ | MX-3631 | 000008 | 192.168.0.8 | loginname | ************ | JANUARY 23, 2020 17:30 | DEPARTMENT 4 |
| ☐ ◯ | MX-6170FV | 000009 | 192.168.0.9 | loginname | ************ | JANUARY 23, 2020 17:30 | DEPARTMENT 3 |
| ☐ ◯ | MX-3631 | 000010 | 192.168.0.10 | loginname | ************ | JANUARY 23, 2020 17:30 | DEPARTMENT 2 |
| ☐ ◯ | MX-4071 | 000096 | 192.168.0.96 | loginname | ************ | JANUARY 23, 2020 17:30 | DEPARTMENT 1 |
| ☐ ✕ | MX-3631 | 000097 | 192.168.0.97 | loginname | ************ | JANUARY 23, 2020 17:30 | DEPARTMENT 2 |
| ☐ ✕ | MX-6170FV | 000098 | 192.168.0.98 | loginname | ************ | JANUARY 23, 2020 17:30 | DEPARTMENT 2 |
| ☐ ◯ | MX-3631 | 000099 | 192.168.0.99 | loginname | ************ | JANUARY 23, 2020 17:30 | DEPARTMENT 2 |
| ☐ ◯ | MX-4071 | 000100 | 192.168.0.100 | loginname | ************ | JANUARY 23, 2020 17:30 | DEPARTMENT 1 |

Sample.com Accountant Enterprise  AGGREGATE  AGGREGATION PATTERN: SOL1  SETTING

DEVICE LIST
USER LIST
GROUP LIST

AGGREGATION PERIOD:
START DATE    END DATE
START AGGREGATION
ADD DEVICE | DELETE DEVICE | CHANGE AGGREGATION TARGET

AGGREGATION TARGET

Sample.com Accountant Enterprise  AGGREGATE  AGGREGATION PATTERN: SOL1  SETTING

DEVICE LIST
USER LIST
GROUP LIST

W12

AGGREGATION PERIOD:
START DATE [ ]  END DATE [ ]
START AGGREGATION

AGGREGATION TARGET

| | ADD DEVICE | DELETE DEVICE | CHANGE AGGREGATION TARGET | | | | | | |
|---|---|---|---|---|---|---|---|---|---|
| | | MODEL NAME | SERIAL NUMBER | IP ADDRESS | ADMINISTRATOR LOGIN NAME | ADMINISTRATOR PASSWORD | JOB LOG ACQUISITION TIME | REMARKS | |
| ☐ | ○ | MX-6170 | 000001 | NO IP ADDRESS INFORMATION | loginname | ************ | JANUARY 23, 2020 17:30 | FIRST FACTORY | ← R16a |
| ☐ | ○ | MX-3631 | 000002 | 192.168.0.2 | loginname | ************ | JANUARY 23, 2020 17:30 | HEAD OFFICE | |
| ☐ | ○ | MX-4071 | 000003 | 192.168.0.3 | loginname | ************ | JANUARY 23, 2020 17:30 | DEPARTMENT 1 | |
| ☐ | ✕ | MX-3631 | 000004 | 192.168.0.4 | loginname | ************ | JANUARY 23, 2020 17:30 | DEPARTMENT 1 | |
| ☐ | ✕ | MX-6170FV | 000005 | 192.168.0.5 | loginname | ************ | JANUARY 23, 2020 17:30 | DEPARTMENT 2 | |
| ☐ | ○ | MX-3631 | 000006 | 192.168.0.6 | loginname | ************ | JANUARY 23, 2020 17:30 | DEPARTMENT 2 | |
| ☐ | ○ | MX-4071 | 000007 | 192.168.0.7 | loginname | ************ | JANUARY 23, 2020 17:30 | DEPARTMENT 3 | |
| ☐ | ○ | MX-3631 | 000008 | 192.168.0.8 | loginname | ************ | JANUARY 23, 2020 17:30 | DEPARTMENT 4 | |
| ☐ | ○ | MX-3631 | 000009 | 192.168.0.9 | loginname | ************ | JANUARY 23, 2020 17:30 | DEPARTMENT 3 | |
| ☐ | ○ | MX-6170FV | 000010 | 192.168.0.96 | loginname | ************ | JANUARY 23, 2020 17:30 | DEPARTMENT 2 | |
| ☐ | ○ | MX-3631 | 000096 | 192.168.0.97 | loginname | ************ | JANUARY 23, 2020 17:30 | DEPARTMENT 1 | |
| ☐ | ✕ | MX-4071 | 000097 | 192.168.0.98 | loginname | ************ | JANUARY 23, 2020 17:30 | DEPARTMENT 2 | |
| ☐ | ✕ | MX-6170FV | 000098 | 192.168.0.99 | loginname | ************ | JANUARY 23, 2020 17:30 | DEPARTMENT 2 | |
| ☐ | ○ | MX-3631 | 000099 | 192.168.0.100 | loginname | ************ | JANUARY 23, 2020 17:30 | DEPARTMENT 2 | ← R16b |
| ☐ | ○ | MX-4071 | 000100 | [192.168.0.1] | loginname | ************ | JANUARY 23, 2020 17:30 | DEPARTMENT 1 | |
| ☐ | ✕ | MX-3631 | 999116 | | loginname | ************ | JANUARY 23, 2020 17:30 | DEPARTMENT 1 | |

R12a

INFORMATION PROCESSING DEVICE, INFORMATION PROCESSING SYSTEM, AND INFORMATION PROCESSING METHOD

INCORPORATION BY REFERENCE

This application is based upon and claims the benefit of priority from the corresponding Japanese Patent Application No. 2021-093115 filed on Jun. 2, 2021, the entire contents of which are incorporated herein by reference.

BACKGROUND

Field of the Invention

The present disclosure relates to an information processing device and the like.

Description of the Background Art

For example, to maintain and manage image forming devices such as a printer, a fax machine, or a multifunction machine arranged in a network in an office, it is necessary to periodically connect to these devices to monitor a device status.

Conventionally, an equipment management system and the like is known, in which a management device manages equipment status information of a plurality of image forming devices connected via a network, and even if one image forming device of the plurality of image forming devices is moved from its original installation location, the equipment management system can acquire an IP address of a destination location from a server to acquire the equipment status information of the one image forming device.

Such a conventional technique requires a server that manages the IP addresses of the image forming devices arranged in the network. Such a conventional technique also requires a database that associates and manages the IP addresses and network location description information representing description names of positional locations in the network, and thus, the system is complicated and also requires control.

An object of the present disclosure is to provide an information processing device and the like capable of accurately managing a device status without requiring a special server or a database, even if the identification information of an image forming device connected to a network is changed.

SUMMARY

To solve the above-described problems, an information processing device according to the present disclosure includes a storage and a controller, the storage storing identification information and registration information of an image forming device in association with each other, and the information processing device is characterized in that the controller connects to the image forming device, based on the identification information, to acquire device information of the image forming device, and if the acquired device information does not match the registration information, the connected image forming device announces that the connected image forming device is different from the image forming device identified by the registration information.

An information processing system according to the present disclosure includes an image forming device and an information processing device, and the information processing system is characterized in that the information processing device includes a storage and a controller, the storage stores identification information and registration information of the image forming device in association with each other, the controller connects to the image forming device, based on the identification information, to acquire device information of the image forming device, if the acquired device information does not match the registration information, the connected image forming device announces that the connected image forming device is different from the image forming device identified by the registration information, the image forming device includes an outputter, and the outputter outputs the device information in response to a request by the controller for acquiring the device information.

An information processing method according to the present disclosure is characterized in including storing identification information and registration information of an image forming device in association with each other, connecting to the image forming device, based on the identification information, to acquire device information of the image forming device, and announcing, if the acquired device information does not match the registration information, that the connected image forming device is different from the image forming device identified by the registration information.

According to the present disclosure, it is possible to provide an information processing device and the like capable of accurately managing a device status without requiring a special server or a database, even if the identification information of an image forming device connected to a network is changed.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table for describing an example of a data structure of an equipment information list.

FIG. 7 is a diagram for describing an operation example of the first embodiment.

FIG. 8 is a diagram for describing an operation example of the first embodiment.

DETAILED DESCRIPTION

Embodiments of the present disclosure will be described below with reference to the drawings. In the present disclosure, an example in which an information processing device according to the present disclosure is applied to a personal computer (PC) is described, but the present disclosure is not limited thereto. The information processing device is not particularly limited, as long as the information processing device is capable of performing an arithmetic process based on input information and outputting an arithmetic result in a predetermined format. The present disclosure describes an example in which an image forming device according to the present disclosure is applied to a multifunction machine capable of performing a plurality of functions such as copying, fax, scanning, and E-mail transmission in one housing, but the present disclosure is not limited thereto. For example, there is no particular limitation, as long as the image forming device is an image forming device capable of transmitting and receiving information, such as a copying machine, a printer device, or a facsimile device. The following embodiments are examples for describing the present disclosure, and the technical scope described in the claims is not limited to the following description.

1 First Embodiment

A first embodiment includes a storage that associates and stores an IP address serving as identification information and registration information of the image forming device, and a controller capable of connecting to the image forming device, based on the IP address, to acquire device information of the image forming device. If the acquired device information does not match the registration information, the controller announces that the connected image forming device is different from the image forming device identified by the registration information.

1.1 Overall Configuration

Figure 1:
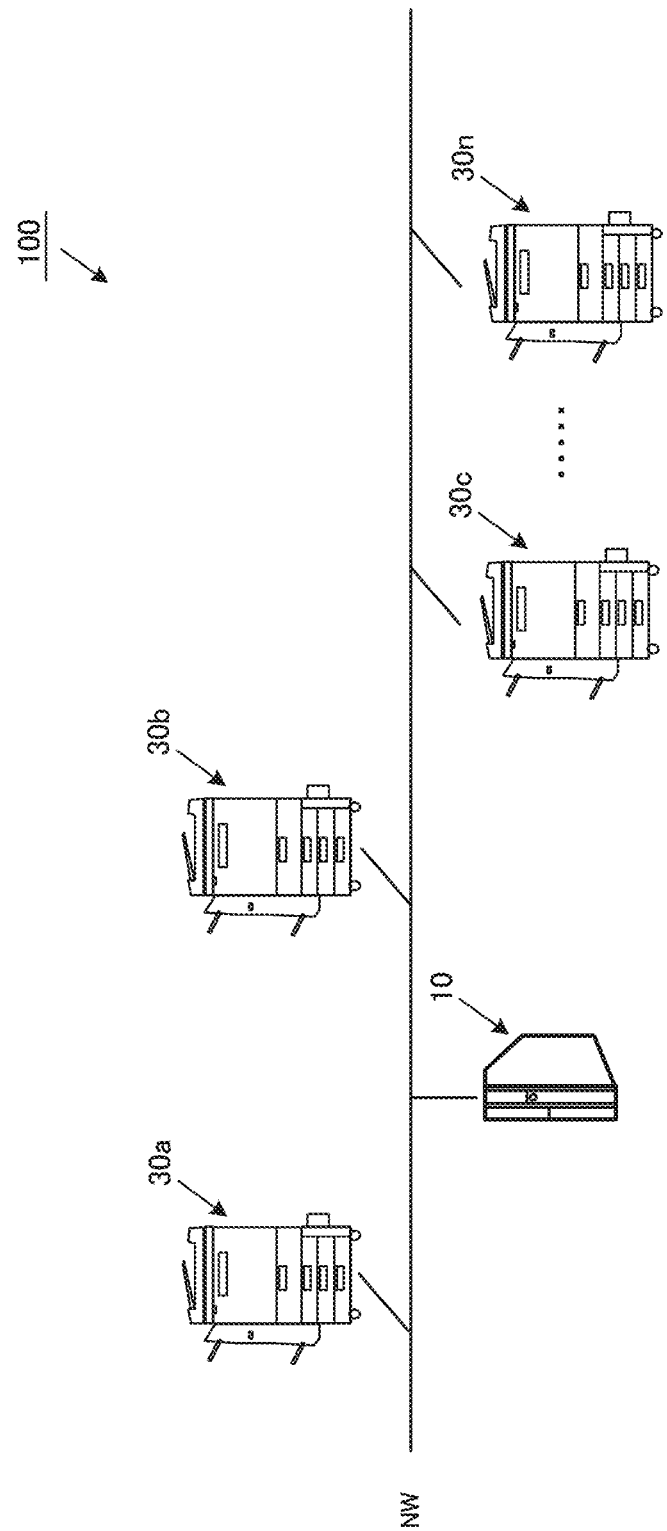
FIG. 1 is diagram for describing a system configuration according to a first embodiment.

FIG. 1 is a diagram schematically describing an overall configuration of an information processing system 100 according to the first embodiment. In the information processing system 100, a PC 10 and a plurality of multifunction machines 30a to 30n are connected to each other via a network NW such as a local area network (LAN) or a wide area network (WAN). FIG. 1 is an example in which the PC 10 and the multifunction machines 30a to 30n are located in the same network NW, but the PC 10 and the multifunction machines 30a to 30n may be connected via different networks NW. The PC 10 and a part of the multifunction machines (for example, the multifunction machines 30a to 30c) may be located in the same network NW, and the other multifunction machines (for example, the multifunction machines 30d to 30n) may be located in a different network NW. The number of the PCs 10 and the number of the multifunction machines 30a to 30n may be increased or decreased.

1.2 Functional Configuration 1.2.1 PC 10

First, the PC 10 as an information processing device according to the first embodiment will be described. The PC 10 according to the first embodiment connects to the multifunction machines 30a to 30n in the network NW, based on an IP address serving as identification information. The PC 10 will be described as a device having a function of acquiring and aggregating job logs, which are the history of jobs (for example, a copy job, a fax job, an image transmission job, and the like) executed by any one or all of the multifunction machines 30a to 30n, and displaying a result of the aggregation to a user.

Figure 2:
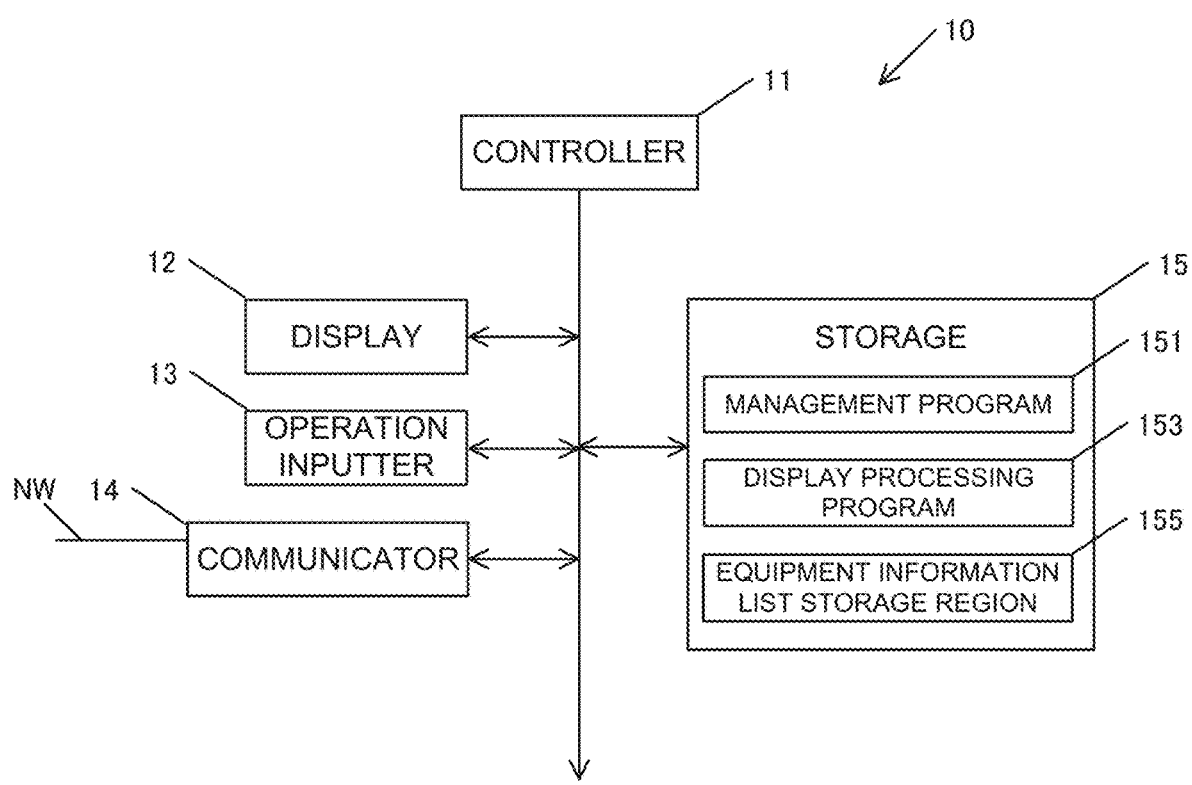
FIG. 2 is a diagram for describing a functional configuration of an information processing device according to the first embodiment.

FIG. 2 is a diagram illustrating a functional configuration of the PC 10. The PC 10 includes a controller 11, a display 12, an operation inputter 13, a communicator 14, and a storage 15.

The controller 11 wholly controls the PC 10. The controller 11 includes one arithmetic device or a plurality of arithmetic devices (for example, a central processing unit (CPU)). The controller 11 reads and executes various types of programs stored in the storage 15 to implement a function of the programs.

The display 12 displays various types of information to the user and the like. The display 12 may include a liquid crystal display (LCD) or an electro-luminescence (EL) display, for example.

The operation inputter 13 receives information input from the user or the like. For example, an inputter such as a keyboard and a mouse may be employed as the operation inputter 13.

The communicator 14 includes any one of a wired or a wireless interface or both wired and wireless interfaces for communicating with another device via the network NW such as a LAN or WAN.

The storage 15 stores various types of programs and various types of data necessary for an operation of the PC 10. For example, the storage 15 may include a storage device such as a random access memory (RAM), a hard disk drive (HDD), a solid state drive (SSD), a read only memory (ROM), and the like.

In the first embodiment, the storage 15 stores a management program 151 and a display processing program 153, and secures an equipment information list storage region 155.

The management program 151 is a program read by the controller 11 to manage an equipment information list serving as registration information. After reading the management program 151, the controller 11 reads IP addresses of the multifunction machines 30a to 30n from the equipment information list. The controller 11 attempts to connect to the multifunction machines 30a to 30n, based on the read IP addresses. When the connection is successful, the controller 11 acquires device information from each of the connected devices, that is, the multifunction machines 30a to 30n. The controller 11 compares the acquired device information with the registration information in the equipment information list, and if the acquired device information does not match the registration information, the controller 11 notifies the user of the fact that the connected multifunction machines 30a to 30n are different from the multifunction machines 30a to 30n identified by the registration information. The controller 11 performs a specific process including displaying the IP addresses of the multifunction machines 30a to 30n in which the device information and the registration information do not match. The process executed by the controller 11 will be described later.

For example, the display processing program 153 is a program read by the controller 11 to display, on the display 12, an equipment information management screen or the like described later. After reading the display processing program 153, the controller 11 creates the equipment information management screen, based on non-illustrated frame information, content arrangement information, and the like, and displays the created equipment information management screen on the display 12.

The equipment information list storage region 155 is a storage region for storing an equipment information list illustrated in the following drawing.

Here, the equipment information list according to the present disclosure will be described. FIG. 3 is a diagram for describing one aspect of a data structure of the equipment information list stored in the equipment information list storage region 155.

The equipment information list is a list of information in which the identification information (the IP address) of the multifunction machines arranged in the network and the equipment information serving as registration information are associated with each other (individual pieces of information being referred to as equipment information). Examples of items constituting the equipment information include, as illustrated in FIG. 3, an aggregation target, an IP address, a model name, a serial number, a job log acquisition time, a final job ID, an administrator login name, an (administrator) password, remarks, and the like.

The aggregation target is a value for determining whether the multifunction machine is a device for which a job log is to be acquired. If the value of the aggregation target is "TRUE", the controller 11 having read the management program 151 attempts to connect to the multifunction machines 30a to 30n registered by the IP address representing the next item, to acquire device information such as the model name and the serial number. On the other hand, if the value of the aggregation target is "FALSE", the controller 11 does not acquire the device information from the multifunction machine for which the aggregation target is "FALSE".

The IP address is information for identifying each of the multifunction machines 30a to 30n to be connected located in the network NW. In FIG. 3, the IP addresses are listed as 32-bit data compliant with IPv4, but the IP addresses are not limited thereto, and may be listed as 128-bit data compliant with IPv6. The IP addresses may be private IP addresses in the LAN or global IP addresses usable on the Internet.

In addition to the IP address, a media access control (MAC) address may be used as the identification information, for example. A combination of the IP address and the MAC address may also be used as the identification information.

The model name represents a manufacturing model name of the multifunction machines 30a to 30n. The serial number represents a manufacturing serial number of the multifunction machines 30a to 30n. For example, if the model name and the serial number acquired as the device information from the multifunction machines 30a to 30n connected based on the IP addresses match the model name (for example, MX-6170FV) and the serial number (for example, 000001) included in the registration information registered in the equipment information, the controller 11 may determine that the multifunction machines 30a to 30n identified by the IP addresses are the multifunction machines 30a to 30n registered in the equipment information list. The device information is not limited to the model name and the serial number, and any information may be used as long as the multifunction machines 30a to 30n can be identified by the information, for example, the above-mentioned MAC address, a sequence number indicating an arrangement order in an office and the like, an identification number uniquely assigned in an organization to which the multifunction machines 30a to 30n belong, and the like.

The job log acquisition time is the date and time when the job log is acquired from the connected multifunction machines 30a to 30n. The final job ID is the final job ID of a job executed by the connected multifunction machines 30a to 30n. The administrator login name represents a login name of an administrator who manages the multifunction machines 30a to 30n, and the (administrator) password represents a password used by the administrator to log in. The remarks may represent, for example, arrangement locations of the multifunction machines 30a to 30n.

1.2.2 Multifunction Machines 30a to 30n.

Next, a functional configuration of the multifunction machines 30a to 30n will be described. The multifunction machines 30a to 30n according to the first embodiment may have different configurations or may have the same configuration. The multifunction machines 30a to 30n may have a common main configuration. In the following description, the multifunction machines 30a to 30n will be referred to as a multifunction machine 30, unless the description is limited to a specific multifunction machine.

Figure 4:
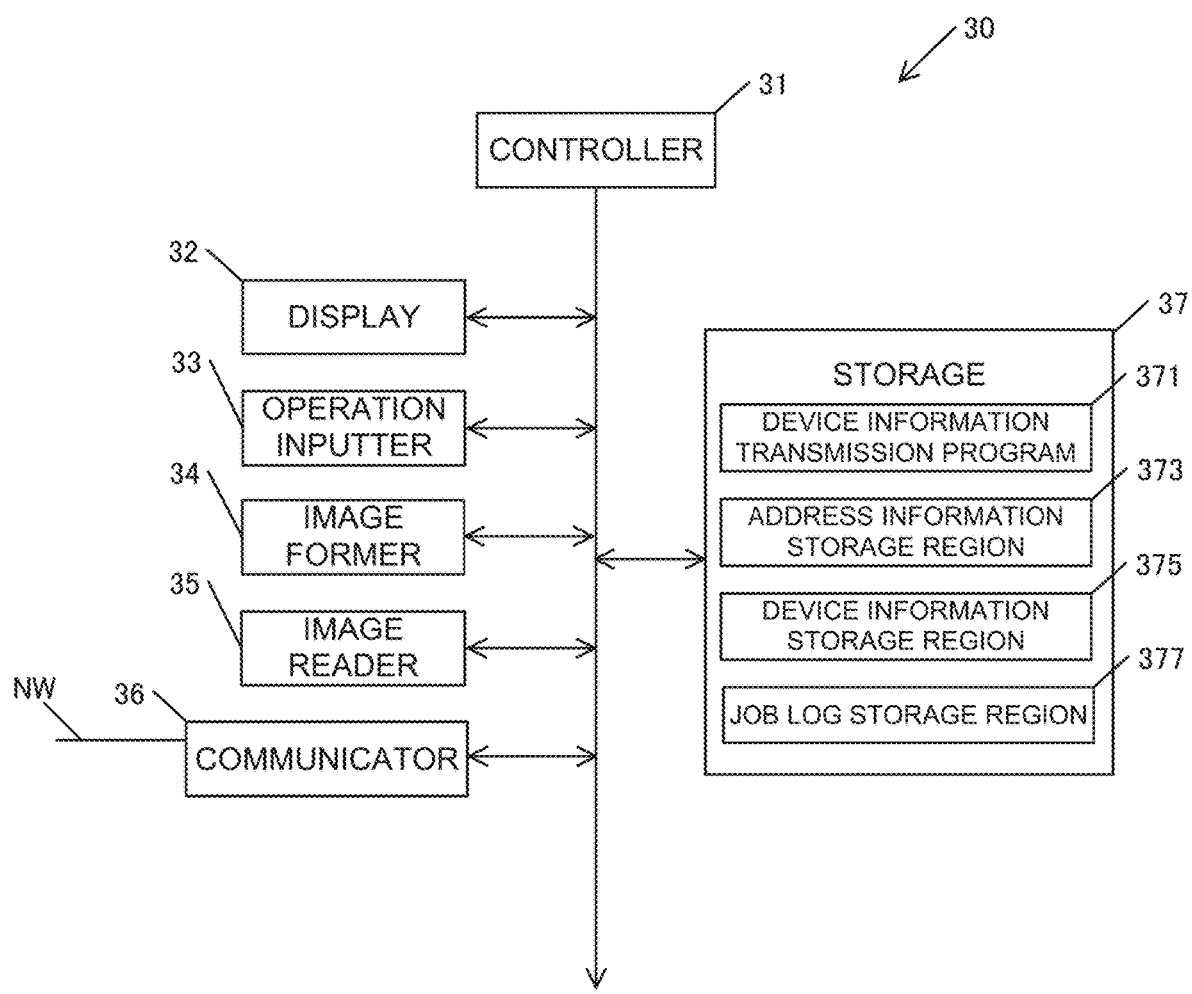
FIG. 4 is a diagram for describing a functional configuration of a multifunction machine according to the first embodiment.

FIG. 4 is a diagram illustrating a functional configuration of the multifunction machine 30. The multifunction machine 30 includes a controller 31, a display 32, an operation inputter 33, an image former 34, an image reader 35, a communicator 36, and a storage 37.

The controller 31 wholly controls the multifunction machine 30. For example, the controller 31 includes one arithmetic device or a plurality of arithmetic devices (a CPU or the like). The controller 31 reads and executes various types of programs stored in the storage 37 to implement a function of the programs.

The display 32 displays various types of information to the user. For example, the display 32 may include an LCD, an organic EL display, and the like.

The operation inputter 33 receives information input from the user or the like. The operation inputter 33 may include a hard key (for example, a numeric keypad, a button, or the like). The operation inputter 33 may include a touch panel display or the like capable of receiving an input via the display 32. In this case, a resistance film method, an infrared method, an electromagnetic induction method, a capacitive method, and the like may be employed as input methods to the touch panel display.

Based on image data (for example, image data generated by scanning a printed document, image data input from an external device, an external recording medium, and the like), the image former 34 forms an image on a sheet as a recording medium and outputs the image. The image former 34 may include, for example, a laser printer or the like utilizing an electrophotographic method. The image former 34 forms an image by using toner supplied from a non-illustrated toner cartridge corresponding to a toner color (for example, cyan, magenta, yellow, and black).

The image reader 35 scans and reads a printed image (document image) to be read to generate and output image data. The image reader 35 may include, for example, a scanner device provided with an image sensor such as a charge coupled device (CCD) and a contact image sensor (CIS). A configuration of the image reader 35 is not limited, as long as the image reader 35 is capable of reading a reflected light image from a printed document by the image sensor to output image data.

The storage 37 stores various types of programs and various types of data necessary for an operation of the multifunction machine 30. For example, the storage 37 may include a storage device such as a RAM, an HDD, an SSD, and a ROM.

In the first embodiment, the storage 37 stores a device information transmission program 371 and secures an address information storage region 373, a device information storage region 375, and a job log storage region 377.

The device information transmission program 371 is a program read by the controller 11 to compare, in response to a request from the PC 10 attempting to connect, an IP address used for the connection with an IP address of the controller 11 stored in the address information storage region 373. The controller 11 that reads the device information transmission program 371 functions as an outputter. If the result of the comparison indicates that the IP addresses match, the controller 11 transmits the device information stored in the device information storage region 375 to the PC 10.

The address information storage region 373 is a storage region for storing address information such as an IP address indicating a positional location in the network.

The device information storage region 375 is a storage region for storing a model name, a serial number, and the like serving as device information.

The job log storage region 377 is a storage region for storing, as a job log, an execution record of a job executed by controlling the image former 34, the image reader 35, and the like.

1.3 Process Flow

Next, the processing according to the first embodiment will be wholly described with reference to the sequence diagram of FIG. 5. First, the PC 10 reads the management program 151. After reading the management program 151, the controller 11 refers to the equipment information list, and attempts to connect to the multifunction machine 30 for example, based on the IP address registered as the identification information of the multifunction machine 30a, by polling based on a communication protocol such as a simple network management protocol (SNMP). If the connection with the multifunction machine 30 is successful, the PC 10 inquires, in an inquiry to the multifunction machine 30a, about whether device information is present (step S100).

When receiving the inquiry about whether device information is present, the controller 31 of the multifunction machine 30a reads the device information transmission program 371. The controller 31 compares the IP address used for the connection with the IP address of the controller 31 stored in the address information storage region 373. If the result of the comparison indicates that the IP addresses match, the device information stored in the device information storage region 375 is read (step S102).

After reading the device information, the controller 31 transmits the device information to the PC 10 (step S104).

Similarly, in an inquiry to all of the remaining multifunction machines (the multifunction machines 30b to 30n) registered in the equipment information list, the PC 10 inquires about the device information, and if any one of the multifunction machines 30b to 30n includes the device information, the PC 10 acquires the device information (steps S106 to S110).

For example, the user inputs, to the PC 10, an instruction to start an application such as job log aggregation (step S112).

When the user inputs the instruction to start the application, the controller 11 starts the application (step S114). The controller 11 reads the display processing program 153 to display a management screen provided by the application on the display 12 (step S116). At this time, the controller 11 performs a display process of the management screen, based on a result of a comparison between the device information acquired from the multifunction machines 30a to 30n and the equipment information list.

The user refers to the displayed management screen to perform a process of aggregating job logs and the like (step S118).

Next, a processing from the device information inquiry in step S100 of FIG. 5 to the display of the management screen in step S116 will be further described with reference to the flowchart in FIG. 6.

After reading the management program 151, the controller 11 refers to the equipment information list and repeatedly transmits a request for device information acquisition for the pieces of equipment (the multifunction machines 30) in the equipment information list (step S200).

The controller 11 compares the acquired device information with the equipment information in the equipment information list (step S210).

If the acquired device information and the equipment information in the equipment information list match, the controller 11 executes any process such as a job log aggregation process by using the acquired device information, and ends the process (step S220; Yes→step S230).

On the other hand, if the acquired device information and the equipment information in the equipment information list do not match, the controller 11 sets the IP address of the equipment information corresponding to equipment (the multifunction machine 30) for which the pieces of information do not match, to "no IP address information" (step S220; No→step S240).

Subsequently, the controller 11 determines whether the equipment information list includes the equipment information corresponding to the acquired device information (step S250). If the equipment information list includes the equipment information corresponding to the acquired device information, the controller 11 rewrites the IP address in the equipment information for the equipment (the multifunction machine 30) in the equipment information list (step S250; Yes→step S260).

If the IP address of the equipment (the multifunction machine 30) in which the pieces of information do not match is correctly set by the user, the controller 11 returns the processing to step S200 (step S270→step S200).

On the other hand, if the equipment information list does not include the equipment information corresponding to the acquired device information, the controller 11 adds the equipment (the multifunction machine 30) corresponding to the device information to the end of the equipment information list as a non-communication target (step S250; No→step S280).

Next, in an inquiry to the user, the controller 11 inquires about whether the equipment (the multifunction machine 30) added to the equipment information list is to be set as a management target (step S290).

If the equipment (the multifunction machine 30) added to the equipment information list is selected by the user as the management target, the controller 11 sets the equipment (the multifunction machine 30) as a communication target (step S290; Yes→step S300). When the IP address of the equipment (the multifunction machine 30) in which the pieces of information do not match is correctly set by the user, the controller 11 returns the processing to step S200 (step S270→step S200).

If the equipment (the multifunction machine 30) added to the equipment information list is not selected by the user as the management target, the user correctly sets the IP address of the equipment (the multifunction machine 30) in which the pieces of information do not match, and then, the controller 11 returns the processing to step S200 (step S290; No→step S200).

1.4 Operation Example

Next, an operation example according to the first embodiment will be described. FIG. 7 is an example of a configuration of a management screen W10 according to a job log aggregation process displayed on the display 12 by the controller 11 of the PC 10. The present operation example is an example of a display operation of the management screen W10 displayed via the display 12, when the acquired device information and the equipment information in the equipment information list match (step S220 in FIG. 6; Yes).

The management screen W10 includes an equipment information list display region R10, an aggregation target display region R12, a registration information display region R14, and an IP address display region R16.

The equipment information list display region R10 is a display region that displays a registration content of the equipment information list for each equipment (multifunction machine 30). The equipment information list display region R10 illustrated in FIG. 7 is an example in which a total of 15 pieces of equipment (multifunction machines 30) are arranged in a network and items constituting the equipment information are displayed for each piece of equipment (multifunction machine 30).

The aggregation target display region R12 is a display region where the values of the aggregation targets are reflected and displayed as the items constituting the equipment information. For example, if a value of the aggregation target is "TRUE" in the equipment information, a circle mark is displayed in the aggregation target display region R12 to indicate that the value is "TRUE". On the other hand, if the value of the aggregation target is "FALSE", a cross mark is displayed in the aggregation target display region R12 to indicate that the value is "FALSE".

The registration information display region R14 is a display region where values of the model names and the serial numbers, which serve as the registration information, are reflected and displayed as the items constituting the equipment information.

The IP address display region R16 is a display region that displays the IP addresses of the multifunction machines 30.

Figure 6:
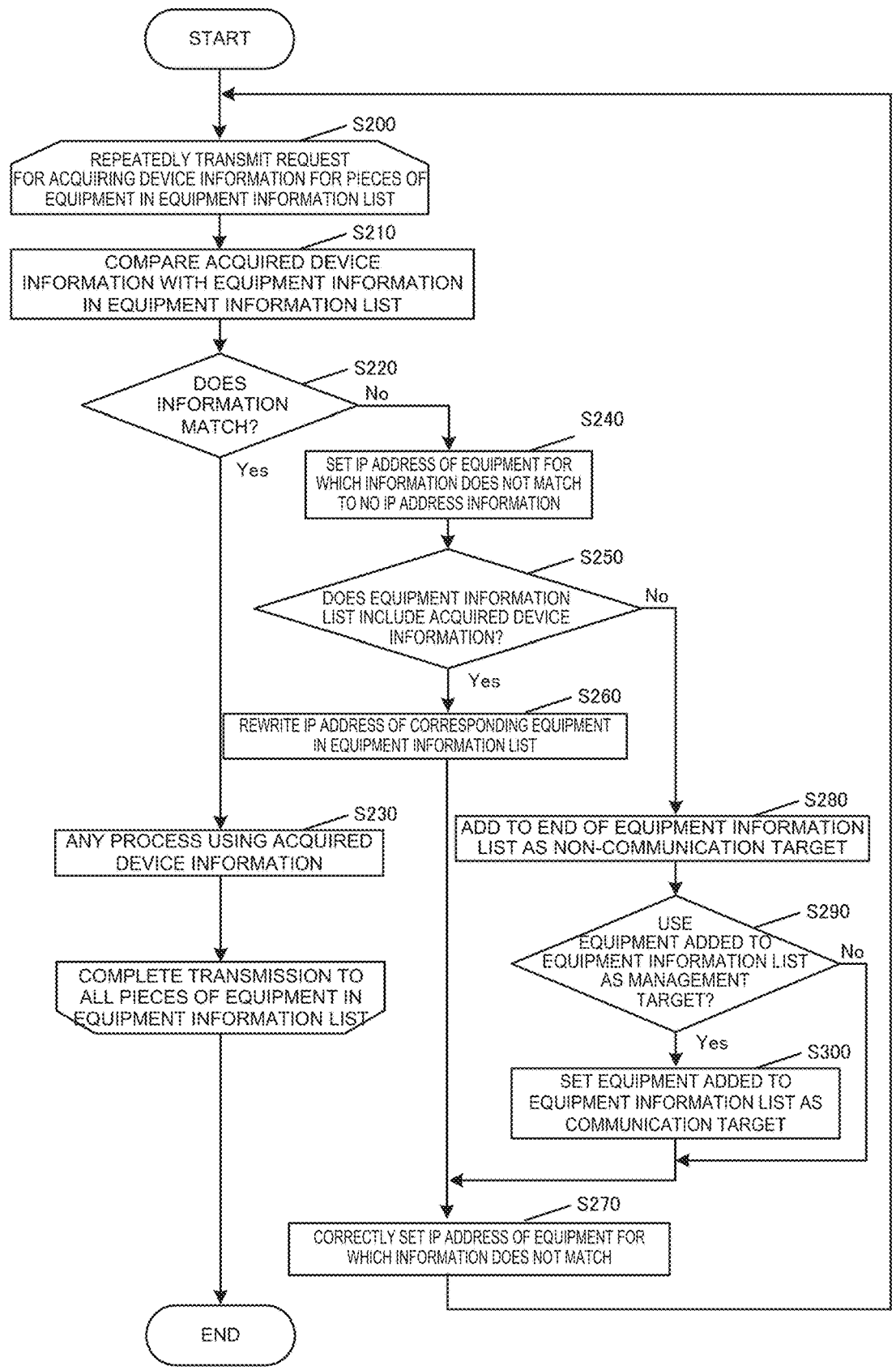
FIG. 6 is a flowchart for describing a process flow of the first embodiment.

Next, the operation example illustrated in FIG. 8 is an example of a display operation of a management screen W12 displayed via the display 12, when the acquired device information and the equipment information in the equipment information list do not match (step S220 in FIG. 6; No).

The present operation example includes an operation example in which connection is attempted assuming that the multifunction machine 30 of model name: MX-6170FV and serial number: 000001 has the IP address "192.168.0.1". Here, the IP address of the multifunction machine 30 identified by the model name: MX-6170FV and the serial number: 000001 is changed due to reasons such as the device moving from the arrangement location. In this case, "no IP address information" is set in an IP address display region R16a of the multifunction machine 30 having the model name: MX-6170FV and the serial number: 000001. In addition, to express that the multifunction machine 30 in which the IP address is changed is different from the multifunction machine 30 identified by the equipment information serving as the registration information, equipment information H10 corresponding to the multifunction machine 30 in which the IP address is changed is highlighted.

In the network, a location of the IP address "192.168.0.1" for which the connection is attempted, is assigned to the multifunction machine 30 with the model name: MX-3631 and the serial number: 000110. In this case, "192.168.0.1" is set in an IP address display region R16b in the equipment information of the multifunction machine 30. The equipment information of the multifunction machine 30 is added to the end of the equipment information list as a non-communication target (an aggregation target display region R12a in FIG. 8), and equipment information H12 corresponding to the multifunction machine 30 is highlighted.

Incidentally, when the IP address of the multifunction machine 30 having the model name: MX-6170FV and the serial number: 000001 is assigned to the multifunction machine 30 having the model name: MX-3631 and the serial number: 000110, the controller 11 may display, on the display 12, a confirmation screen W20 illustrated in FIG. 9.

Figure 9:
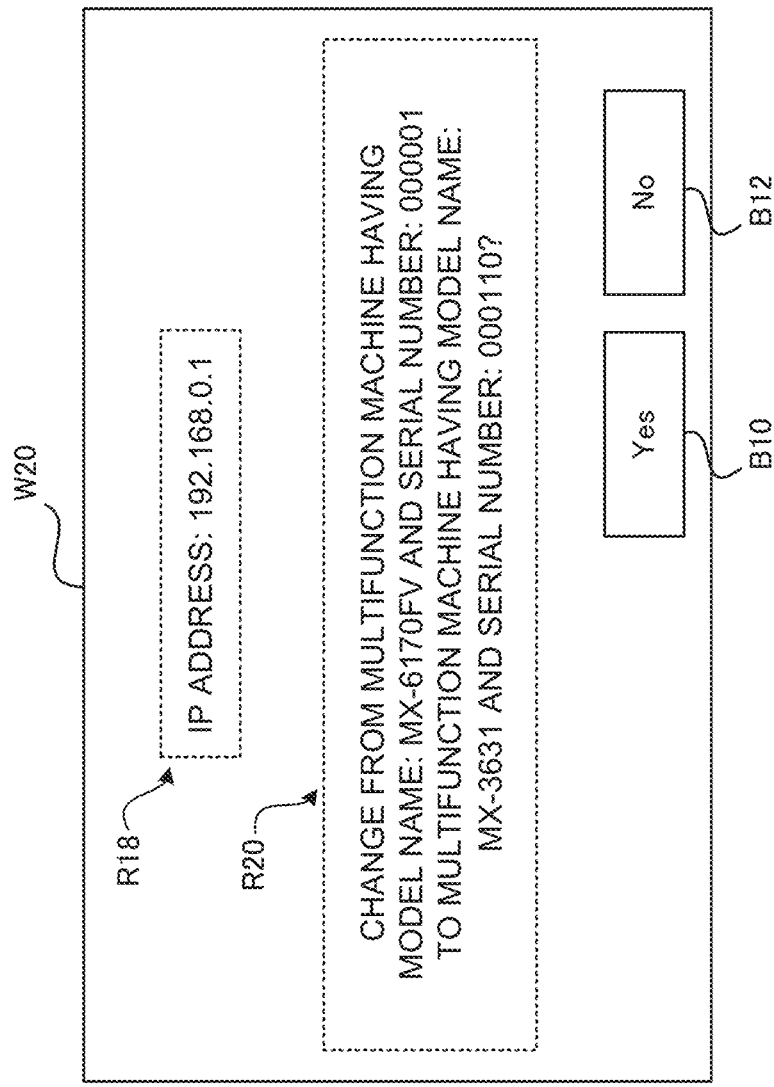
FIG. 9 is a diagram for describing an operation example of the first embodiment.

The confirmation screen W20 illustrated in FIG. 9 includes, for example, an assigned IP address display region R18, a message display region R20, a Yes button B10, and a No button B12.

The assigned IP address display region R18 is a display region that displays an IP address to be assigned.

The message display region R20 is a display region that displays the model name and the serial number of the multifunction machine 30 related to the assigned IP address before the change and the model name and the serial number of the multifunction machine 30 after the change.

The Yes button B10 and the No button B12 are buttons for receiving an input indicating whether the assigned IP address is to be changed. If the user depresses the Yes button B10, the controller 11 changes the assigned IP address. On the other hand, if the user depresses the No button B12, the controller 11 does not change the assigned IP address.

Thus, the multifunction machine 30 related to the assigned IP address before the change and the multifunction machine 30 related to the assigned IP address after the change are displayed to the user, and the assigned IP address is changed after approval by the user, so that more accurate device management can be performed.

Figure 10:
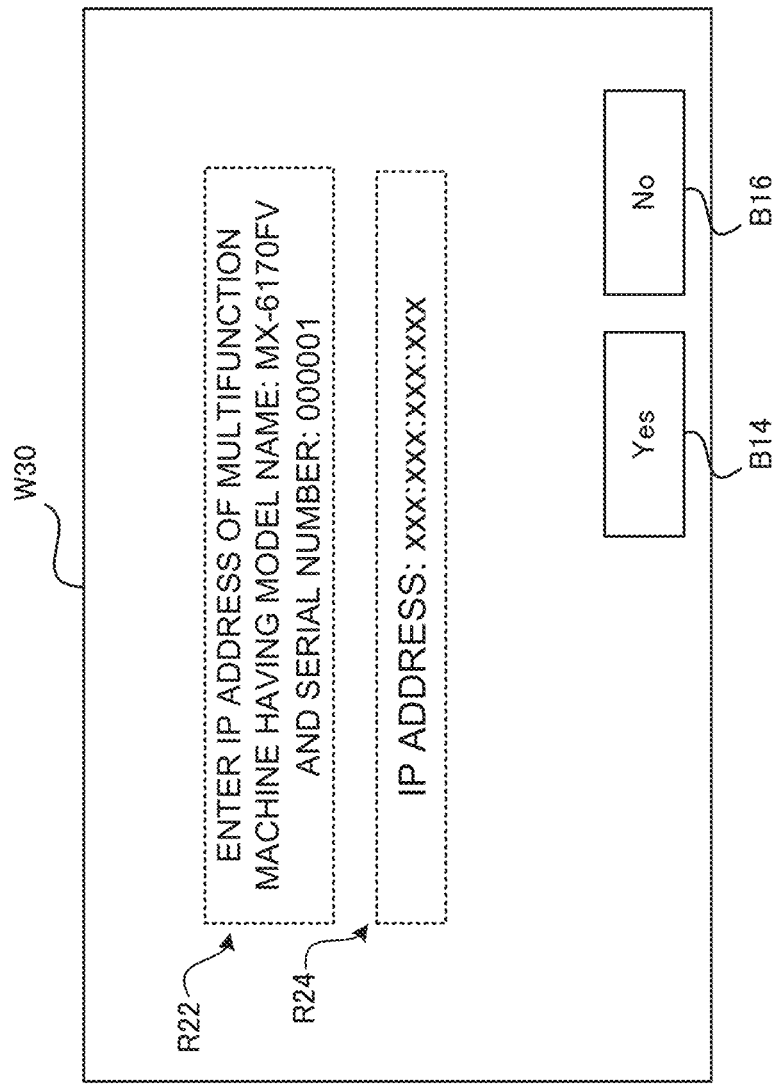
FIG. 10 is a diagram for describing an operation example of the first embodiment.

FIG. 10 is an example of a configuration of an input screen W30 displayed to receive the input of an IP address actually assigned to the multifunction machine 30 for which "no IP address information" is set in the IP address display region R16a in FIG. 8.

The input screen W30 includes a message display region R22, an IP address input region R24, a Yes button B14, and a No button B16.

The message display region R22 is a display screen that displays the model name and the serial number of the multifunction machine 30 to which an IP address is to be assigned and a message prompting the input of the IP address.

The IP address input region R24 is a region that receives the input of the IP address from the user.

The Yes button B14 and the No button B16 are buttons for receiving approval or cancellation of the IP address input. If the Yes button B14 is depressed by the user, the controller 11 receives the IP address input in the IP address input region R24. On the other hand, if the No button B16 is depressed by the user, the controller 11 cancels the IP address input in the IP address input region R24. When receiving the IP address input in the IP address input region R24, the controller 11 displays the received IP address, instead of displaying "no IP address information" in the IP address display region R16a.

The user can input, via the input screen W30, a correct IP address of the multifunction machine 30 for which "no IP address information" is set in the IP address display region R16a. This makes it possible to more reliably associate the network address with the equipment information serving as the registration information.

Figure 11:
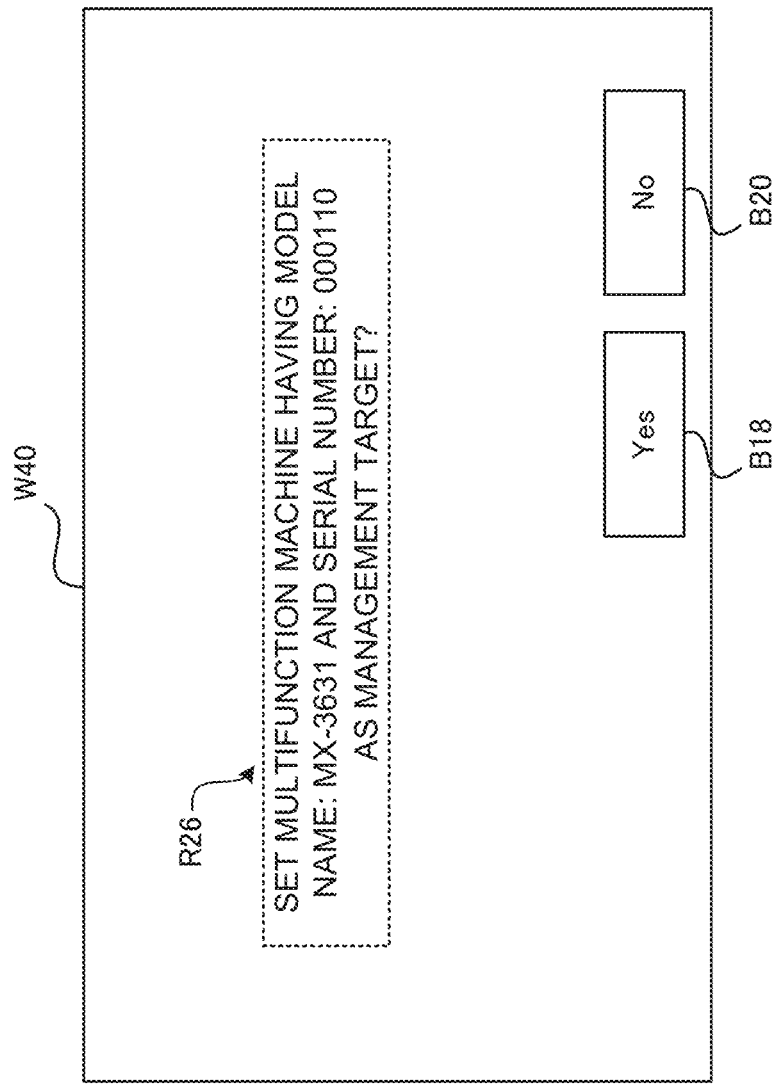
FIG. 11 is a diagram for describing an operation example of the first embodiment.

FIG. 11 is an example of a configuration of an inquiry screen W40 for inquiring, in an inquiry to the user, about whether to select the equipment (the multifunction machine 30) added to the end of the equipment information list as a management target.

The inquiry screen W40 includes an inquiry display region R26, a Yes button B18, and a No button B20.

The inquiry display region R26 is a display region that displays the content of the inquiry to the user about whether to select the equipment (the multifunction machine 30) added to the equipment information list as a management target.

The Yes button B18 and the No button B20 are buttons for receiving approval or cancellation of a selection indicating whether to select the equipment (the multifunction machine 30) displayed in the inquiry display region R26 as a management target. If the Yes button B18 is depressed by the user, the controller 11 sets, as a communication target, the equipment (the multifunction machine 30) selected as the management target. On the other hand, if the No button B20 is depressed by the user, selection of the equipment (the multifunction machine 30) as a management target is canceled.

As described above, according to the first embodiment, even if the identification information of a multifunction machine connected to the network is changed, it is possible to accurately manage a device status, without requiring a special server or a database.

2 Second Embodiment

In a second embodiment, if the identification information is changed, the multifunction machine notifies the PC of the changed identification information. When receiving the notification, the PC updates the equipment information (list), based on the changed network address.

2.1 Functional Configuration 2.1.1 PC 50

Figure 12:
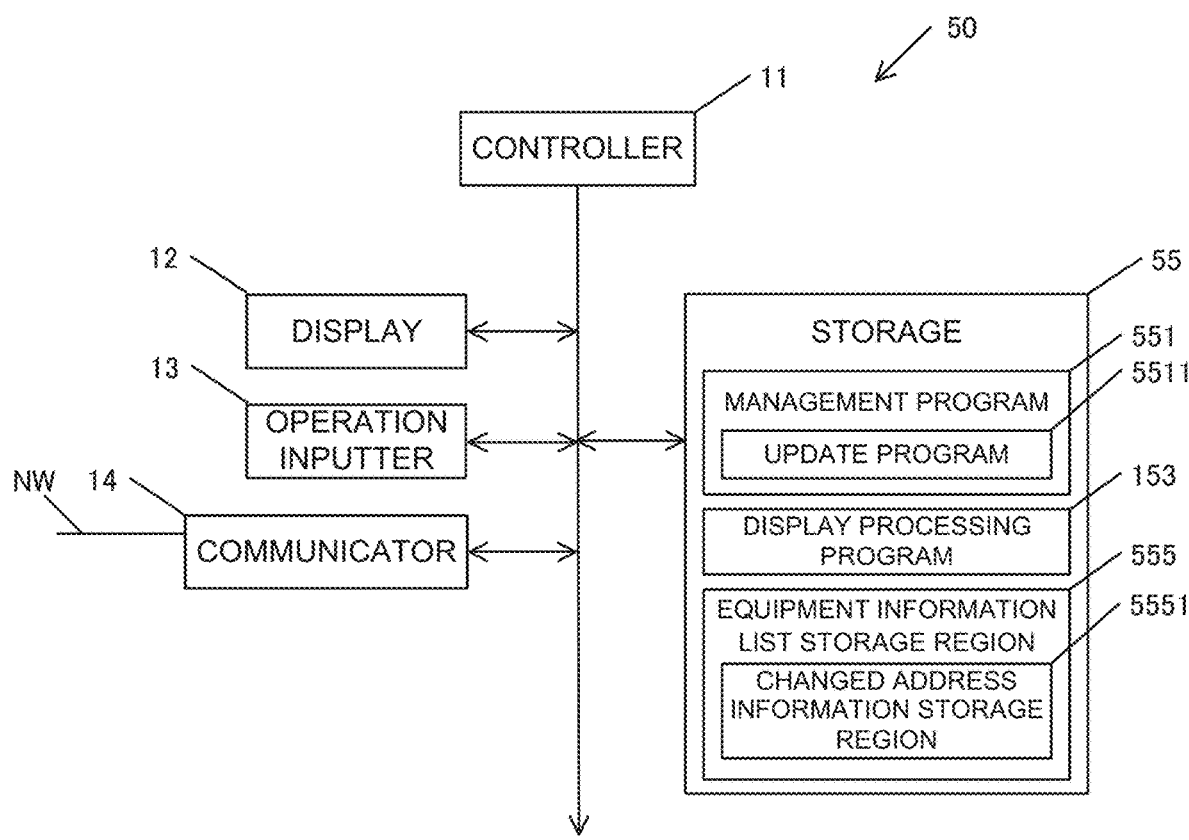
FIG. 12 is a diagram for describing a functional configuration of an information processing device according to a second embodiment.

FIG. 12 is a diagram illustrating a functional configuration of a PC 50 according to the second embodiment. Parts that are the same as those of the PC 10 according to the first embodiment are designated by the same reference numerals and description thereof may be omitted.

The PC 50 includes the controller 11, the display 12, the operation inputter 13, the communicator 14, and a storage 55.

In the second embodiment, the storage 55 stores a management program 551 and the display processing program 153, and secures an equipment information list storage region 555.

The management program 551 includes an update program 5511, in addition to the configuration of the management program 151 according to the first embodiment. The update program 5511 is a program read by the controller 11, when an IP address serving as the changed identification information is received from a multifunction machine 70 and the IP address is reflected in the equipment information list in an update process. The controller 11 may read the update program 5511 when receiving the changed IP address or when reading the management program 551.

The equipment information list storage region 555 includes a changed address information storage region 5551, in addition to the configuration of the equipment information list storage region 155 according to the first embodiment. The changed address information storage region 5551 is a storage region for storing the changed IP address, when the changed IP address is received from the multifunction machine 70.

2.1.2 Multifunction Machine 70

Figure 13:
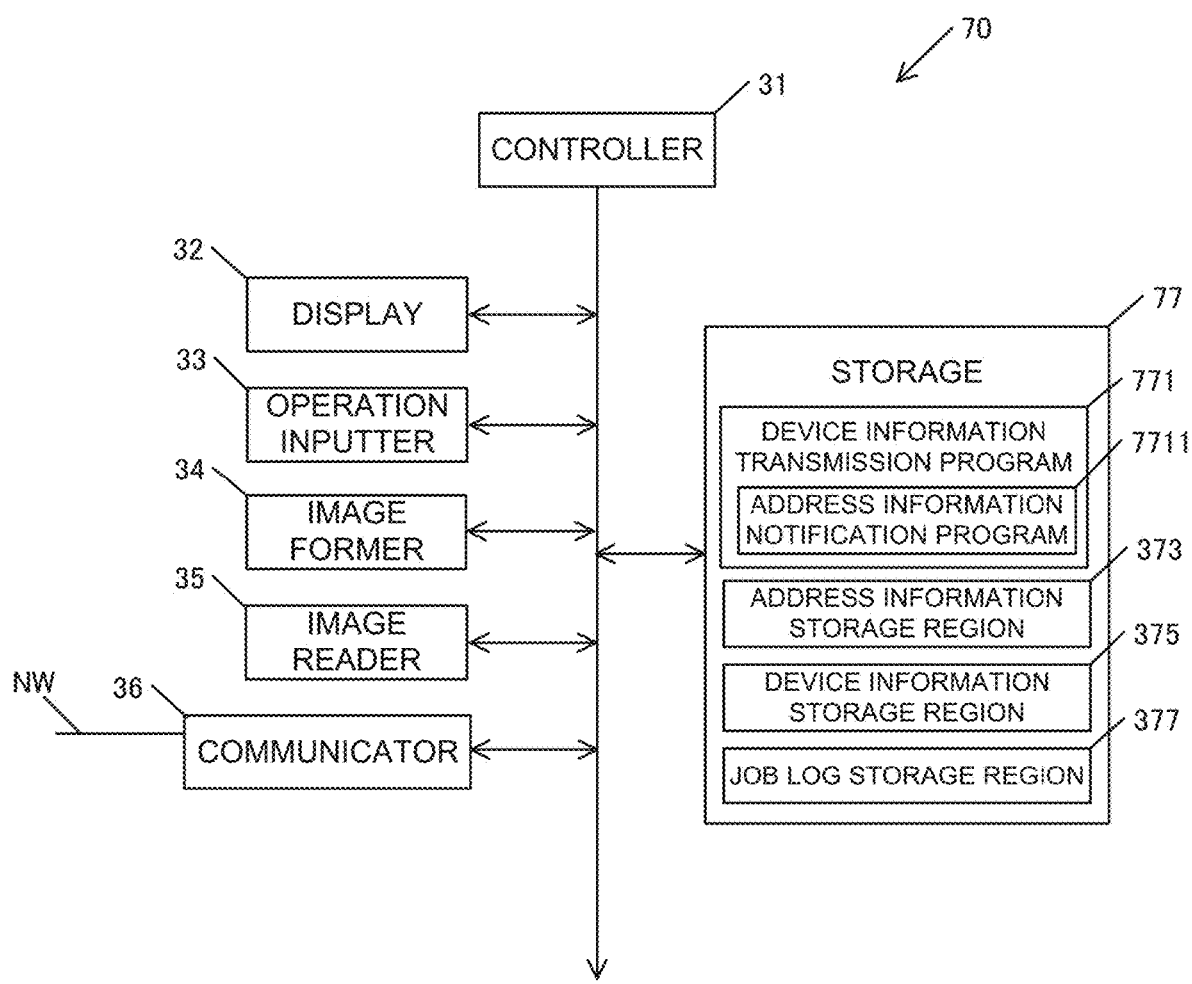
FIG. 13 is a diagram for describing a functional configuration of a multifunction machine according to the second embodiment.

FIG. 13 is a diagram illustrating a functional configuration of the multifunction machine 70. Parts that are the same as those of the multifunction machine 30 according to the first embodiment are designated by the same reference numerals and description thereof may be omitted.

The multifunction machine 70 includes the controller 31, the display 32, the operation inputter 33, the image former 34, the image reader 35, the communicator 36, and a storage 77.

In the second embodiment, the storage 77 stores a device information transmission program 771 and secures the address information storage region 373, the device information storage region 375, and the job log storage region 377.

The device information transmission program 771 includes an address information notification program 7711, in addition to the configuration of the device information transmission program 371 according to the first embodiment. The address information notification program 7711 is a program read by the controller 31 to notify the PC 50 of the changed IP address, when the IP address serving as the identification information is changed. The controller 31 that reads the address information notification program 7711 functions as an identification information change notifier.

2.2 Process Flow

Figure 14:
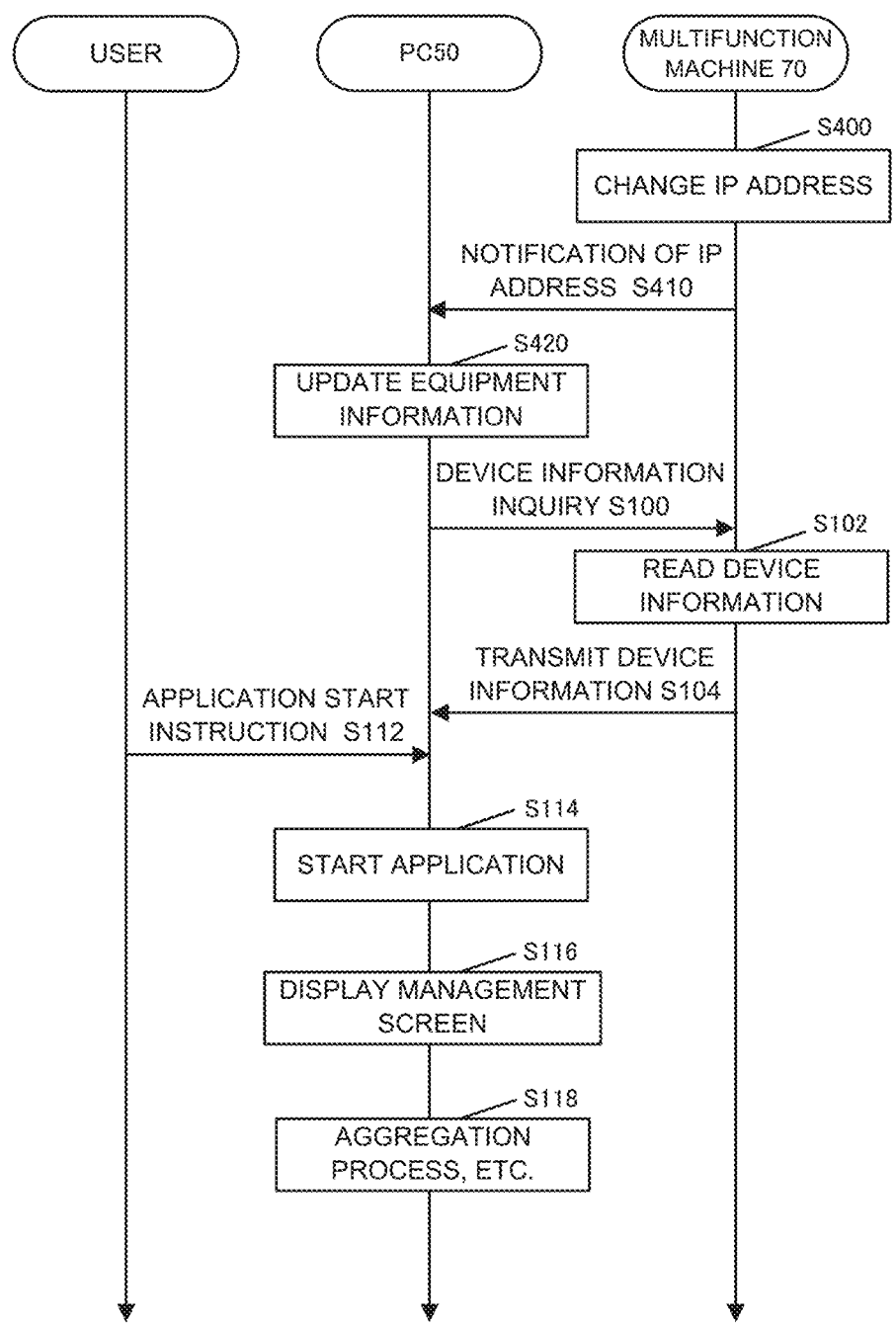
FIG. 14 is a sequence diagram for wholly describing the processing of the second embodiment.

Next, the processing according to the second embodiment will be wholly described with reference to the sequence diagram of FIG. 14. Processes that are the same as those described in the sequence diagram of FIG. 5 in the first embodiment may be designated by the same reference numerals and description thereof may be omitted.

For example, when the location of any one of the multifunction machines 70 in the network is changed due to a change in the arrangement location of the one multifunction machine 70 or the like, the IP address of the one multifunction machine 70 is also changed (step S400). At this time, the controller 31 reads the address information notification program 7711. After reading the address information notification program 7711, the controller 31 notifies the PC 50 of the changed IP address (step S410).

In step S410, the multifunction machine 70 may notify the PC 50 of the changed IP address by a trap based on a communication protocol such as SNMP. The PC 50 may acquire (receive) the changed IP address by polling. The PC 50 may acquire the IP address from the MAC address of the multifunction machine 70 by a reverse address resolution protocol (RARP). In this case, the PC 50 can acquire the IP address, the device information, and the like from an (IP) packet acquired from the multifunction machine 70.

The PC 50 updates the equipment information of the multifunction machine 70, based on the acquired IP address (step S420).

Figure 5:
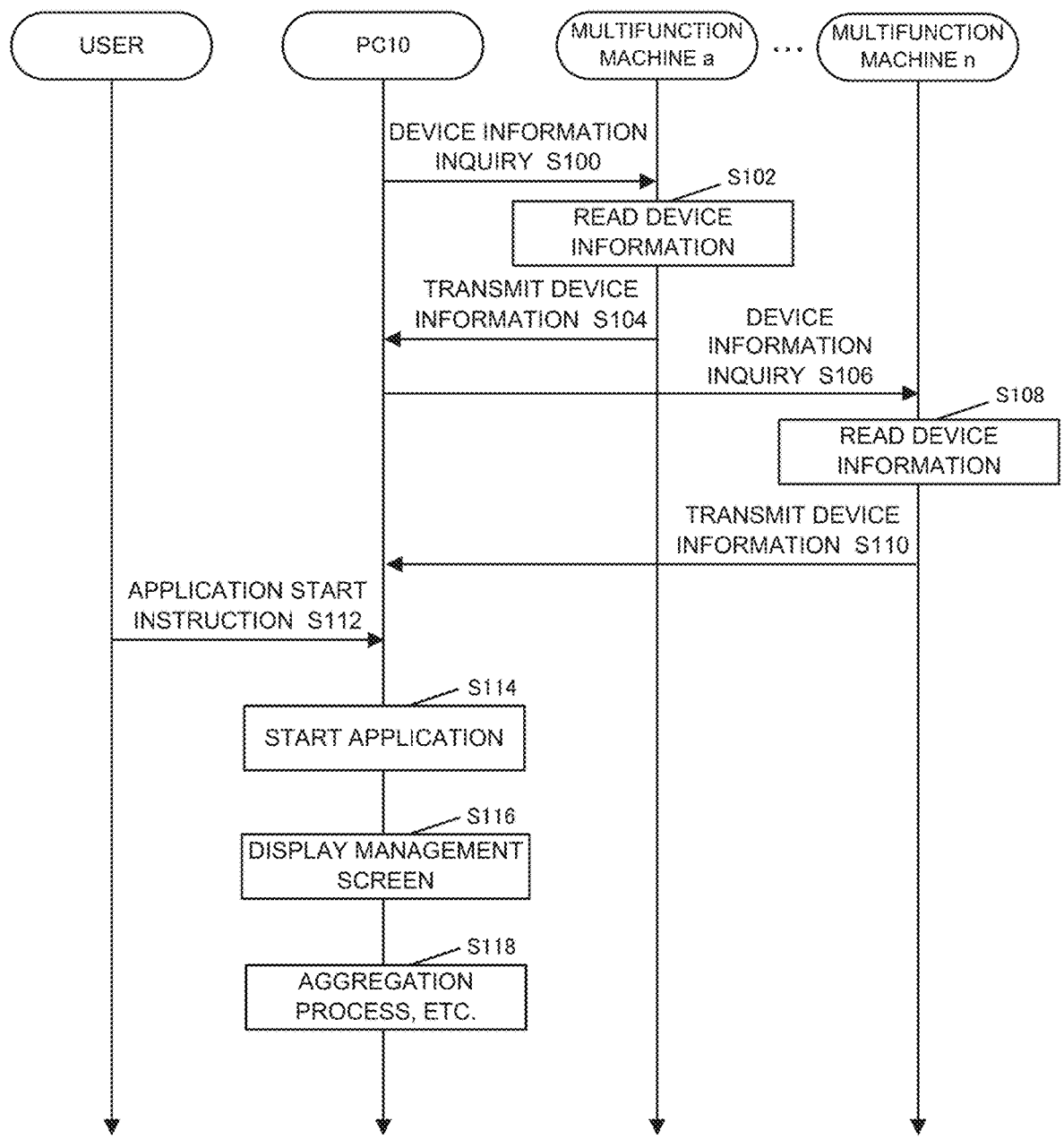
FIG. 5 is a sequence diagram for wholly describing the processing of the first embodiment.

After the equipment information list is updated, the device information inquiry process (step S100) and the subsequent processes may be performed similarly to the processes described in the sequence diagram of FIG. 5.

As described above, according to the second embodiment, when the IP address is changed in a multifunction machine, the multifunction machine notifies the PC of the changed IP address. Thus, in addition to the effects of the first embodiment, it is possible to acquire the newest position information of the multifunction machine in the network and to update an equipment information list, based on the position information, so that it is possible to more accurately manage the device information.

3 Third Embodiment

In a third embodiment, a multifunction machine realizes the functions of the information processing device according to the first embodiment.

3.1 Overall Configuration

Figure 15:
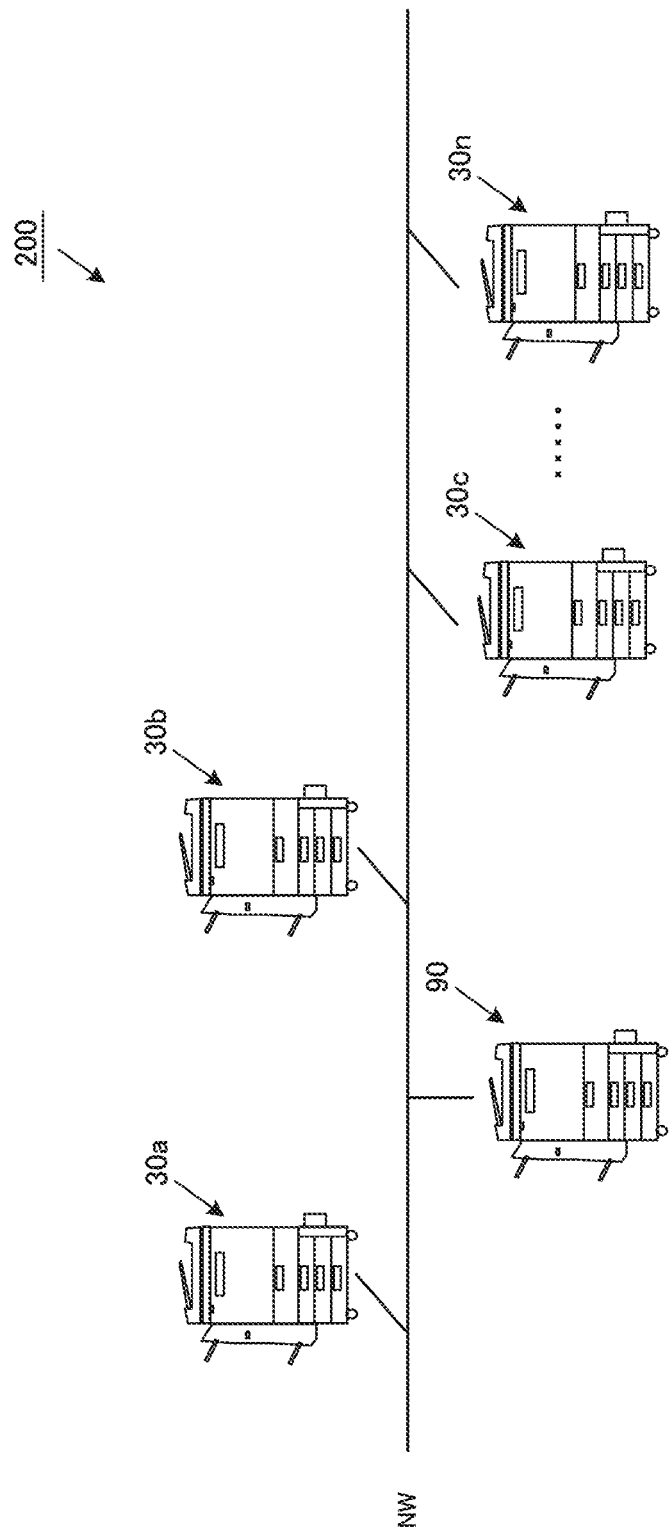
FIG. 15 is diagram for describing a system configuration according to a third embodiment.

FIG. 15 is a diagram schematically illustrating an overall configuration of an information processing system 200 according to the third embodiment. In the information processing system 200, a multifunction machine 90 and the multifunction machines 30a to 30n are connected to each other via a network NW such as a LAN or WAN. The configuration of the information processing system 200 is not limited to the example illustrated in FIG. 15, and the number of the multifunction machines 90 and the number of the multifunction machines 30a to 30n may be increased or decreased.

3.2 Functional Configuration 3.2.1 Multifunction Machine 90

Figure 16:
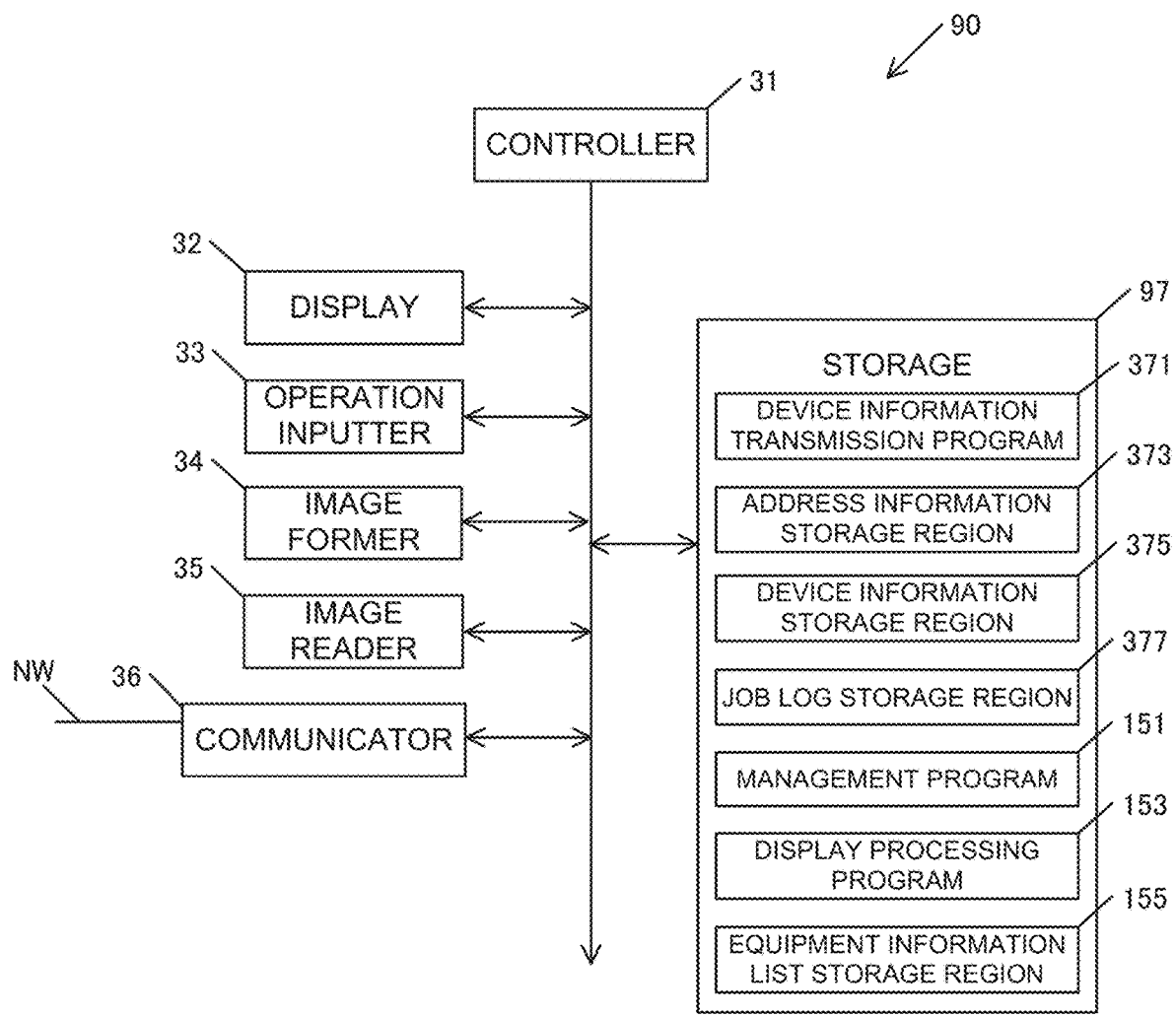
FIG. 16 is a diagram for describing a functional configuration of a multifunction machine according to the third embodiment.

FIG. 16 is a diagram illustrating a functional configuration of the multifunction machine 90. The multifunction machine 90 includes a storage 97, instead of the storage 37 of the multifunction machine 30 according to the first embodiment. Parts that are the same as those of the multifunction machine 30 or the PC 10 according to the first embodiment are designated by the same reference numerals and description thereof may be omitted.

In the third embodiment, the storage 97 stores the device information transmission program 371, the management program 151, and the display processing program 153, and secures the address information storage region 373, the device information storage region 375, the job log storage region 377, and the equipment information list storage region 155.

3.2.2 Other Multifunction Machines 30

The functional configuration of the multifunction machines 30 (30a to 30n) other than the multifunction machine 90 can be the same as that of the multifunction machines 30 described in the first embodiment, and thus, description thereof is omitted here.

3.3 Process Flow

The multifunction machine 90 performs the processing described in the sequence diagram of FIG. 5 instead of the PC 10 according to the first embodiment.

As described above, according to the third embodiment, an information processing device such as a PC is not provided and the multifunction machine realizes the functions of the information processing device, so that an effect similar to the first embodiment can be obtained.

The present disclosure is not limited to the above-described embodiments, and various modifications are possible. That is, embodiments obtained by combining technical members appropriately changed within the scope not departing from the gist of the present disclosure are also included in the technical scope of the present disclosure.

Although the above-described embodiments have portions described separately for convenience of description, it is needless to say that the embodiments may be combined within a technically possible range to be implemented.

A program operating in each of the devices in the embodiments is a program (a program for causing a computer to function) for controlling a CPU and the like to realize the functions of the above-described embodiments. Information processed by these devices is temporarily stored in a temporary storage device (such as a RAM) at the time of processing the information, and then, stored in storage devices such as various types of ROMs and HDDs, and read or corrected/written by the CPU as necessary.

Here, examples of a storage medium for storing the program may include a semiconductor medium (such as a ROM and a non-volatile memory card), an optical recording medium/magneto-optical recording medium (such as a digital versatile disc (DVD), a magneto optical disc (MO), a mini disc (MD), a compact disc (CD), and a Blu-ray (registered trademark) disk (BD), and a magnetic recording medium (such as magnetic tape and a flexible disk). If the loaded program is executed, not only the functions of the above-described embodiments may be realized, but also the functions of the present disclosure may be realized as a result of performing processing in cooperation with an operating system, another application program, or the like, based on an instruction of the program.

If the program is distributed to a market, the program may be stored in a portable storage medium to be distributed, or the program may be transferred to a server computer connected via a network such as the Internet. In this case, of course, a storage device of the server computer is also included in the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An information processing device comprising:
    a storage;
    a controller; and
    a display, wherein
    the storage stores identification information and registration information of an image forming device in association with each other,
    the controller connects to the image forming device, based on the identification information, to acquire device information of the image forming device,
    if the acquired device information does not match the registration information, the controller announces that the connected image forming device is different from the image forming device identified by the registration information,
    if the registration information matching the device information exists, the controller rewrites the identification information associated with the registration information,
    the display is capable of displaying a list of the registration information, and
    if the acquired device information does not match the registration information:

the controller controls the display to indicate that the connected image forming device is different from the image forming device identified by the registration information, and the controller further controls the display to display the registration information that does not match the acquired device information in a display format different from other registration information.

2. The information processing device according to claim 1, wherein, if the registration information matching the device information does not exist, the controller inquires about whether the image forming device related to the device information is to be set as a registration target.

3. The information processing device according to claim 1, further comprising:
a printer; and
a job log storage that stores a record of a job related to image formation as a job log.

4. An information processing system comprising:
an image forming device;
an information processing device, wherein the information processing device includes a first storage, a first controller, and a display,
the first storage stores identification information and registration information of the image forming device in association with each other,
the first controller connects to the image forming device, based on the identification information, to acquire device information of the image forming device,
if the acquired device information does not match the registration information, the first controller announces that the connected image forming device is different from the image forming device identified by the registration information,
if the registration information matching the device information exists, the first controller rewrites the identification information associated with the registration information,
the display is capable of displaying a list of the registration information, and
if the acquired device information does not match the registration information:
the first controller controls the display to indicate that the connected image forming device is different from the image forming device identified by the registration information, and
the first controller further controls the display to display the registration information that does not match the acquired device information in a display format different from other registration information; and the image forming device includes a second controller, and a second storage that stores computer-readable instructions, wherein the second controller, by performing the computer-readable instructions stored in the second storage, outputs the device information in response to a request by the first controller for acquiring the device information.

5. The information processing system according to claim 4, wherein the second controller transmits to the first controller an identification information change notification that notifies the second controller of a change in the identification information.

6. The information processing system according to claim 4, wherein
the second storage stores a record of an executed job related to image formation as a job log, and
the second controller outputs the device information and the job log to the information processing device.

7. An information processing method comprising:
storing identification information and registration information of an image forming device in association with each other;
connecting to the image forming device, based on the identification information, to acquire device information of the image forming device;
announcing, if the acquired device information does not match the registration information, that the connected image forming device is different from the image forming device identified by the registration information;
rewriting the identification information associated with the registration information if the registration information matching the device information exists;
displaying a list of the registration information on a display,
controlling, if the acquired device information does not match the registration information, the display to indicate that the connected image forming device is different from the image forming device identified by the registration information; and
controlling the display to display the registration information that does not match the acquired device information in a display format different from other registration information.

* * * * *